(12) United States Patent
Hughes et al.

(10) Patent No.: US 6,580,907 B2
(45) Date of Patent: Jun. 17, 2003

(54) MOBILE COMMUNICATIONS

(75) Inventors: John S. Hughes, Suffolk (GB); Stephen Harris, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 10/221,776

(22) PCT Filed: Mar. 21, 2001

(86) PCT No.: PCT/GB01/01233
§ 371 (c)(1), (2), (4) Date: Sep. 17, 2002

(87) PCT Pub. No.: WO01/74109
PCT Pub. Date: Oct. 4, 2001

(65) Prior Publication Data
US 2003/0040309 A1 Feb. 27, 2003

(30) Foreign Application Priority Data
Mar. 28, 2000 (EP) .............................................. 00302504

(51) Int. Cl.$^7$ .................................................. H04Q 7/20
(52) U.S. Cl. ...................... 455/433; 455/432; 455/435; 455/445; 455/458; 455/412; 455/413
(58) Field of Search ................................ 455/432, 433, 455/435, 445, 458, 412, 413

(56) References Cited

U.S. PATENT DOCUMENTS

| | | | |
|---|---|---|---|
| 5,878,347 A | * 3/1999 | Joensuu | 455/433 |
| 5,890,063 A | * 3/1999 | Mills | 455/433 |
| 5,956,637 A | * 9/1999 | Ericsson et al. | 455/414 |
| 6,134,314 A | * 10/2000 | Dougherty et al. | 379/207 |
| 6,188,887 B1 | * 2/2001 | Joong et al. | 455/414 |
| 6,195,543 B1 | * 2/2001 | Granberg | 455/407 |
| 6,282,416 B1 | * 8/2001 | Verdonk | 455/413 |
| 6,345,184 B1 | * 2/2002 | van der Salm et al. | 455/432 |

* cited by examiner

*Primary Examiner*—Thanh Cong Le
*Assistant Examiner*—Tuan Tran
(74) *Attorney, Agent, or Firm*—Nixon & Vanderhye P.C.

(57) ABSTRACT

National mobile networks are provided with a proxy location register for storing user identities in association with respective network identities. Users have an associated "mobile home" for storing call handling instructions and messages recorded by a Voicemail system. When a user roams from a current host network to a visited network, he may request that his mobile home be moved from its current location, most likely that current host network, to the visited network, and retrieval of any messages that have been left for that user can now be done without involving real-time use of international links between networks. Furthermore, when the mobile home has moved, its new location, with or without call handling instructions, can be manually or automatically notified to all other networks, or a subset, for location register updating. The use of this location information can avoid tromboning over expensive international links, and the call handling instructions enables remote networks to decide if a connection is to be attempted to a destination network.

22 Claims, 3 Drawing Sheets

MOBILE COMMUNICATIONS

This application is the U.S. national phase of international application PCT/GB01/01233 filed Mar. 21, 2001 which designated the U.S.

The present invention relates to communications networks, particularly but not exclusively communications networks for providing mobile telephone communication, and to methods of operating such networks.

Mobile communications as a concept embraces not only mobility of a user within his home network, but also the ability for callers to he able to communicate with that user when he has moved to, i.e. registered with, a remote network, referred to as a visited network. This is known as roaming. On a global scale, one can talk about a global mobile network comprising a multiplicity of national mobile networks interconnected by international links.

Callers dial the user's globally unique telephone number, and their calls are, routed to the user's home network, where a register is kept of the current locations of all the users having telephone numbers associated with that home network, and that call is then extended to the user's visited network. This is referred to as tromboning, i.e. the call goes into the home network and out to the visited network, with attendant international call charges and extended call set up units, and it happens even when the caller is in that visited network.

Also, if a roaming user accesses a messaging service in his home network and retrieves his messages, which might be voice or multimedia format, each of these has to be transmitted in real time over international links, and could be subject to congestion.

U.S. Pat. No. 6,038,456 (Colby et al.) discloses a solution to the problem of issuing a user with another mobile telephone number (MSISDN) for use for, e.g. data calls, when the Home Location Register (HLR) unit which records that user's original MSISDN has no spare. Instead of the known practice of a network operator (carrier) ordering a large quantity of phones from a supplier, say 1000, and associating a corresponding block of MSISDNs with a particular HLR unit, Colby et al. propose allocating MSISDNs to HLR units on an individual basis and having a lookup table (called a Register Unit) which signalling transfer points interrogate by the dialed MSISDN in order to find which HLR unit to access for the called user's details.

U.S. Pat. No. 5,915,220 (Chelliah) discloses a mobile network in which the Home Location Register (HLR) has a last visited list of Mobile Switching Centres (MSC) and the deregistration procedure involving a Registration cancel Message is modified such that an MSC at which a user was previously registered does not delete the user's service profile upon receipt from the HLR of a Registration Cancel Message. Thus, if the user revisits an MSC, the HLR knows from its last visited list that that MSC already stores a copy of the user's service profile, and does not send another copy.

According to a first aspect of the present invention there is provided a method of operating a communications network interconnected with a plurality of other communications networks, the method comprising the steps of:

establishing data storage and a location register having entries comprising a user identifier and an associated location identifier; and responding to an originating call to a called user by accessing the location register in accordance with a user identifier for that called user to ascertain the corresponding associated location identifier, and it there is a corresponding entry, and performing connection set up on the basis that the destination network for the called user is that communications network which corresponds to that ascertained location identifier;

the method being characterised in that:

user-associated relocatable data packages currently located at said communications network are stored in said data storage, and each said location identifier represents the most recent location known to said communications network of the corresponding user-associate relocatable data package;

and the method being characterised by the steps of:

receiving from a said other communications network a move request in respect of a specified user, and in response, removing that specified user's associated relocatable data package from the data storage, and relocating that data package to said other communications network.

The use of the location register and the relocatable data package alleviates the above described situations. The user's relocatable data package can be relocated at a time convenient to the network operators, e.g. when there is little traffic between the home network and the visited network, and after it has been moved the user will then be able to retrieve his messages from a local storage of his data package, without involving any international links in his real time retrieval of the messages.

Preferably, there is included the step of responding to receipt from said other communications network of a location register update message in respect that specified user by changing the location identifier of that specified user's entry to that for said other communications network.

There may be included the steps of:

receiving a request from a user, currently registered with said communications network as a visitor, for that visiting user's associated relocatable data package to be relocated to said communications network;

in response to that receipt, accessing the location register in accordance with an identifier for that visiting user; and, if there is a corresponding entry, ascertaining the location identifier of that corresponding entry, and sending a move request in respect of that visiting user to the other communications network corresponding to the ascertained location identifier, else, requesting of at least one of the other communications networks a location identifier for the other communications network currently storing that visiting user's associated relocatable data package, upon receipt of the requested location identifier, sending a move request in respect of that visiting user to the other communications network corresponding to the received location identifier; and upon receipt of that user's associated relocatable data package, storing it in the data storage.

According to a second aspect of the present invention there is provided a method of operating a communications network interconnected with a plurality of other communications networks, at least one of said other communications networks operating in accordance with the first aspect of the present invention, the method comprising the steps of:

receiving a request from a user, currently registered with said communications network as a visitor, for that visiting user's associated relocatable data package to be relocated to said communications network;

in response to that receipt, requesting of at least one of the other communications networks a location identifier for the other communications network currently storing that visiting user's associated relocatable data package;

upon receipt of the requested location identifier, sending to the other communications network corresponding to the received location identifier a move request for that user's associated relocatable data package to be relocated to said communications network, and upon receipt of that user's associated relocatable data package storing it in association with a user identifier for that user.

There may be included the steps of retrieving instructions from a received user-associated relocatable data package, and in accordance with those instructions, effecting modification of each of a predetermined set of the communications networks.

Preferably, the step of effecting modification comprises generating a message and sending that message to each of said predetermined set of the communications networks other than that communications network which performs the step of retrieving instructions.

The retrieved instructions may comprise instructions for modifying the respective location registers by changing the respective stored location identifier to that of the network which performs the step of retrieving instructions.

The retrieved instructions may comprise instructions comprise instructions for storing call handling information and modifying the respective location registers to associate that stored call handling information with the entry corresponding to the received user-associated relocatable data package.

The requesting step may comprise sending a query message in respect of that visiting user to that one of said other communications networks which corresponds to the global address of that visiting user.

Alternatively, the requesting step may comprise sending a query message in respect of that visiting user to each of said other communications networks.

There may be included the steps of connecting calls for a particular user, whose user-associated relocatable data package is currently located at said communications network, to a message recording service and recording messages, and incorporating those recorded messages within that particular user's relocatable data package.

According to a third aspect of the present invention there is provided a communications network arranged for interworking with a plurality of other communications networks and employing a global addressing scheme, the network comprising:

a location register arranged to store entries each comprising a user identifier and an associated location identifier; and means arranged to respond to an originating call to a called user by accessing the location register in accordance with an identifier for that called user and ascertaining the associated location identifier, and performing connection set up on the basis that the destination network for the called user is that communications network which corresponds to that ascertained location identifier;

wherein the network is characterised by:

data storing means arranged to store user-associated relocatable data packages;

means arranged to respond to receipt from a said other communications network of a move request in respect of a specified user' associated relocatable data package stored in the data storing means by removing that specified user's associated relocatable data package from the data storing means, and relocating that data package to said other communications network.

There may be included means arranged to respond to receipt from said other communications network of a message in respect of that specified user and containing location register update information by changing the location identifier of that specified user's entry to that for said other communications network.

There may be included means arranged to respond to a request from a visiting user for that visiting user's associated relocatable data package to be moved to said communications network, by accessing the location register in accordance with an identifier for that visiting user, and, if there is a corresponding entry, ascertaining the associated location identifier, and sending a move request in respect of that visiting user to a said other communications network corresponding to the ascertained location identifier, else requesting of at least one of the other communications networks a location identifier for the other communications network currently storing that visiting user's associated relocatable data package, and, upon receipt of the requested location identifier, sending a move request in respect of that visiting user to that other communications network corresponding to that received location identifier.

According to a fourth aspect of the present invention there is provided a communications network arranged for interworking with a plurality of other communications networks, at least one of said other communications networks being in accordance with the third aspect of the present invention, said communications network comprising:

a location register arranged to store entries each comprising a user identifier and an associated location identifier; and means arranged to respond to an originating call to a called user by accessing the location register in accordance with an identifier for that called user and ascertaining the associated location identifier, and performing Connection Set up on the basis that the destination network for the called user is that communications network which corresponds to that ascertained location identifier;

wherein the network is characterised by:

data storing means, and means arranged to respond to a request from a user, currently registered with said communications network as a visitor, for that user's associated relocatable data package to be moved to said communications network by requesting of at least one of the other communications networks a location identifier for the other communications network currently storing that visiting user's associated data package, upon receipt of the requested network identifier, sending to the other communications network corresponding to the received location identifier a move request for that user's associated data package to be relocated to said communications network, and upon receipt of that user's associated relocatable data package, storing it in said data storing means in association with a user identifier for that user.

There may be included means arranged to retrieve instructions from a received user's relocatable data package, and in accordance with those instructions, to effect modification of each of a predetermined set of the communications networks.

Preferably, the retrieving and modifying means is arranged to effect said modification by generating a message and sending that message to each of said predetermined set of the communications networks other than itself.

Preferably, the retrieving and modifying means is arranged in accordance with those instructions, to modify the respective location register by changing the respective stored location identifier to its own location identifier.

Preferably, when a network of the present invention is for use when those instructions comprise instructions for storing call handling information, the retrieving and modifying means is arranged to modify the respective location register to associate such stored call handling information with the entry corresponding to the received user-associated relocatable data package.

A network of the present invention may be arranged to make said request of at least one of the other communications networks for said network identifier by sending a query message in respect of that visiting user to that one of said other communications networks which corresponds to the global address of that visiting user.

A network of the present invention may be arranged to make said request of at least one of the other communications networks for said network identifier by sending a query message in respect of that visiting user to each of said other communications networks.

A network of the present invention may have a message recording system, and included means arranged to respond to messages recorded by the message recording system in respect of a particular user whose relocatable data package is currently stored in said data storing means by incorporating those recorded messages within that particular user's relocatable data package.

A specific embodiment of the present invention will now be described by way of example with reference to the drawings in which.

Figure 1:
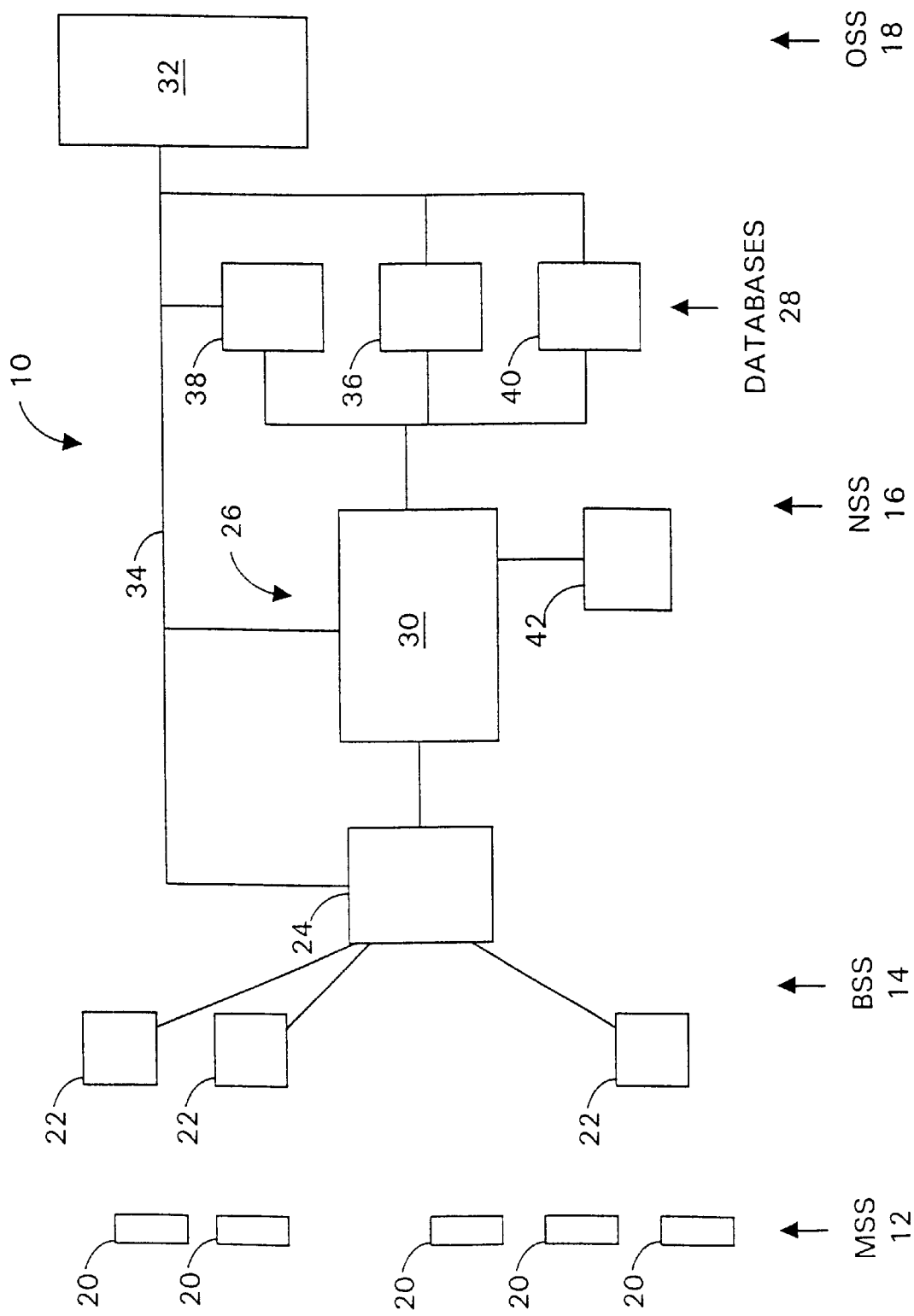
FIG. 1 is a block diagram of some of the components of a GSM network.

In FIG. 1, there is shown a GSM network 10 constituted by four subsystems, namely, Mobile Station Subsystem (MSS) 12, Base Station Subsystem (BSS) 14, Network and Switching Subsystem (NSS) 16 and Operation Subsystem (OSS) 18. The GSM system is well known to the skilled person in the art and will not be described in detail. However, should any reader require more information, he will find a number of publications on GSM, particularly, "The GSM System for Mobile Communications" by M. Mouly and M.-B. Pautet, published 1992 by the authors.

The MSS 12 comprises a plurality of conventional mobile stations 20, also referred to as mobile telephones, or just mobiles.

The BSS 14 comprises a plurality of base transceiver stations 22 and a plurality of base station controllers 24, only one which is shown. Each of the base station controllers 24 is connected to the NSS 16 and to a plurality of the, base transceiver stations 22.

The NSS 16 comprises an exchange system 26 and user and terminal equipment databases 28. The exchange system 26 comprises a plurality of interconnected mobile services switching centres 30, only one which is shown, which are connected to the user and terminal equipment databases 28.

The OSS 18 comprises an operation and maintenance centre 32 which is connected, via a data network 34, to the BSS 14 and the NSS 16.

The user and terminal equipment databases 28 comprise a home location register 36, a visitor location register 38 and an equipment identity register 40.

The home location register 36 is a database which contains user-specific information relevant to the provision of telecommunications services and the current location, the former identifying whether a given teleservice or bearer service can be provided for a user.

The visitor location register 38 temporarily stores subscription data for users who are normally registered with a different home GSM network and who are currently registered with the GSM network 10, i.e. under a roaming arrangement.

When a visiting user within the operational area of the GSM network 10 and wants to use one or more of its GSM services, he swithes on his mobile telephone 20. The mobile telephone 20 performs in known manner a registration procedure in which the user's Mobile Station International ISDN mumber and the International Mobile Station Identity are retrieved from the Subscriber Identity Module (SIM) card in the mobile telephone 20. From this information, the user's home GSM network is ascertained, and the visited network sends a message to the home network. The home network responds by accessing its home location register, retrieving a subset of the user's subscription data, and sending the retrieved subset of subscription data to the visitor location register 38 of the visited network for temporary storage. Typically, this subset contains security data for the authentication of the user.

In the existing GSM system the user can subscribe to an answering service for recording messages, e.g. Voicemail, when calls cannot be delivered to his mobile telephone, and in this case he can retrieve recorded messages by calling an access number for that service, with appropriated authentication, as is known. The messages are recorded in a Voicemail system 42 in the user's home GSM network, and should the user roam to a foreign GSM network and retrieve his messages, they have to be generated individually upon request by the user and relayed across international links to that foreign GSM network in real time during the retieval call to the Voicemail system 42.

Figure 2:
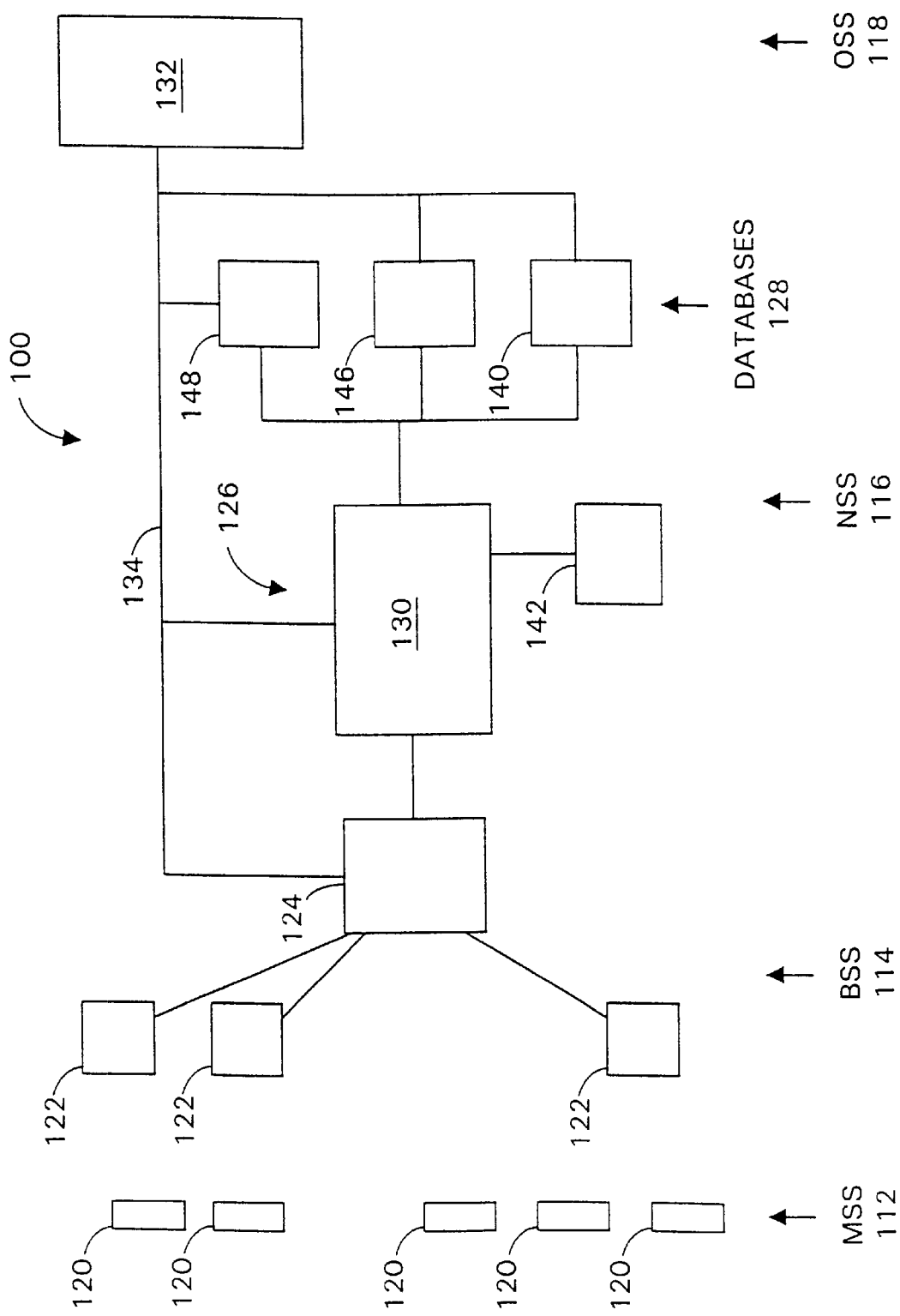
FIG. 2 is a block diagram of some of the components of a network according to the present invention.

FIG. 2 is a block schematic of a GSM network 100, which is similar to the GSM network 10. It comprises corresponding subsystems MSS 112, BSS 114, NSS 116 and OSS 118, with its components 120 to 134 and 142, corresponding to components 20 to 34, 40 and 42 of the network of FIG. 1, and it has been modified in accordance with the present invention, as described below.

Figure 3:
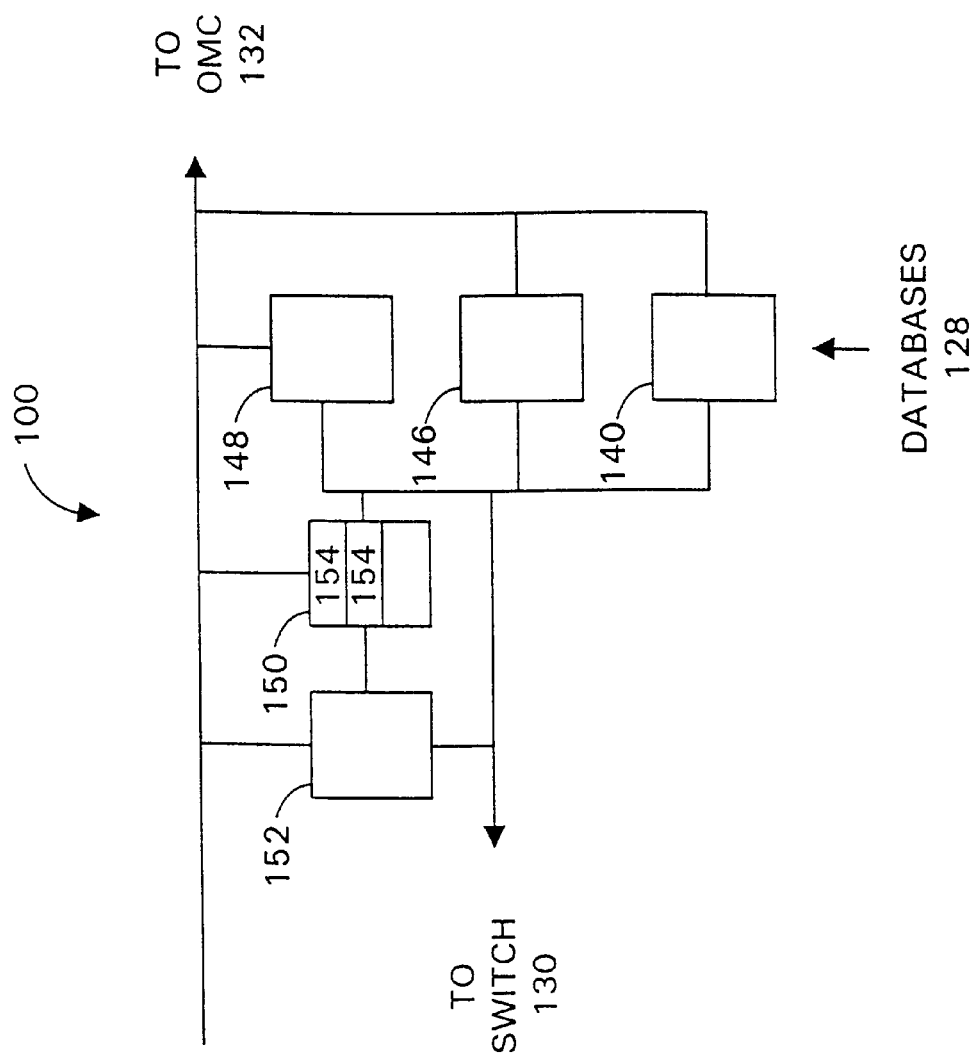
FIG. 3 is a block diagram of part of the network of FIG. 2.

In FIG. 3, there is shown user and terminal equipment databases 128 which is part of the NSS 116. Instead of a visitor location register there is a proxy location register (PRL) 148, and a data store 150 with an associate data store manager 152 arranged to allocated dynamically a respective memory area 154 of the data store 150 for each user currently registered with the GSM network 100, i.e. both home users and visiting users. Instead of a home location register there is an allocation register 146 of users who have been allocated mobile telephone numbers associated with that network. Thus, any GSM network 100 can ascertain from a mobile telephone number which network had allocated that number, such an allocating network is referred to as that mobile's home network, and the numbering scheme is referred to as a global addressing scheme. The PLR 148 and the data store 150 together constitute a storing means of the present invention.

In this embodiment, the GSM network 100 comprises a Voicemail system 142 linked to the NSS 116 and the data store manager 152. For each currently registered user who subscribes to the Voicemail service, relevant subscription information is recorded in a respective user-associated profile stored in the allocation register 146.

Suppose that a call attempt is made to such a currently registered user. The NSS 116 accesses the respective user-associated profile to ascertain how that user requires the call to be handled, discovers that is it is to be delivered to the Voicemail serive, and connects that call to the Voicemail system 142.

In normal manner, the caller leaves a message for the called user, and this message is stored in a dynamically allocated memory area of the Voicemail system 142, and is associated with an identifier for that called user for retrieval purposes.

When the NSS 116 connects that call to the Viocemail system 142, it also alerts the data store manager 152, which responds by sending a retrieval request to the Voicemail system 142 in respect of that called user. When the Voicemail system 142 completes the recording process for that message, it notifies the data store manager 152, and sends a copy of that message. If this the first message to be stored in the data store 150 for that user, the data store manager 152 allocates a respective memory area 154 and writes that message to that memory area. The data store manager 152 associates with that message, in known manner, a sequence identifier to aid retrieval. Subsequent messages are written to that respective memory area 154, and data store manager 152 can created a data object comprising all the messages in that respective memory are 154. For the purpose of this description, such a data object is referred to as a Mobile Home (MH). Each MH is unique to its associated user.

The PLR 148 records the current location of the MHs of certain users. The GSM networks 100 might be organised such that every user has a respective MH. Alternatively, an HM might only be created upon user request. e.g. only users who roam outside their home network would require an MH, and for this case the GSM network 100 will be of a hybrid arrangement, including both a home location register and a PLR.

In one variant, the subsequent messages are written to individual memory areas 154, and the data store manager 152 keeps a record of all messages associated with that user. In this case, the data store manager 152 can create a single data object comprising all the messages in those individual memory areas 154. In another variant, the data store 150 and the data store manager 152 are replaced by a data object manager (not shown) which is arranged, upon command, to retrieve a user's messages from the Voicemail system 142 and create a data object comprising all those retrieved messsages.

In a first example scenario, suppose that there are number of interconnected GEM networks 100-1, 100-2, 100-3 etc., providing "global" mobile communications coverage, it being understood that "global" is not being used in its literal sense, but that such coverage is widespread over the world. Each GEM network has an identifier of the major city of its country (and time zone of that country, if applicable), e.g. London (100-1), Tokyo (100-2), New York (100-3), etc., and for convenience the GEM networks are synonymously referred to herein by their identifier, e.g. if an MH is resident in the London GEM network 100-1, this is alternatively stated as the MH being resident in London, or just being "in London", and, correspondingly, the associated user is said to be hosted in London. Similarly, a user who is currently registered with the London GEM network 100-1 is said to be "registered with London" or "in London".

Suppose that a user A, who had previously been hosted in London and has his user identity "A" recorded in its PLR 148 as currently having his MH resident in London, travels to Japan and switches on his mobile telephone to register with Tokyo. Having registered with Tokyo, user A decides that he wants to retrieve his Voicemail messages, and makes a request to Tokyo for his MH to be moved to his current location.

Tokyo has a respective PLR 148 including an entry for user A, recording the current location of his MH as London. Tokyo accesses its PLR 148, ascertains that user A's MH is in London, and sends a query message to London to check that the MH is indeed in London, and then, upon receipt of a positive response from London, sends a move message commanding London to send the MH to Tokyo. In a variant, London responds to receipt of the query message by sending the MH, and the move message is omitted. The PLRs 148 are situated at the point of ingress to their respective networks so as to minimise transmission delays when responding to user requests for MHs to be moved to a remote network.

Upon receipt of that move message, London, using its data manager 152 will create user A's MH from the stored Voicemail messages and part of user A's profile data relating to PLR update information and sent that MH to Tokyo. The PLR update information defines which networks are to be informed when an MH moves from one network to another, and in this example suppose that user A has selected his PLR update information to be "London", "Tokyo" and "New York". Thus, the PLRs in only these three networks record the current location of user A's MH. User A will select the specified networks of his PLR update information on the basis of where he expects the majority of his incoming calls to originate. However, if he does not wish to select specified networks, he can select "all" networks, but this is not as efficient.

Tokyo will retrieve the PLR update information from user A's MH and send an update message to London and New York, so that they can update the respective entries for user A in their PLR 148 by replacing "London" with "Tokyo", and will also update its own PLR 148.

User A can now access the Voicemail service, and Tokyo will provide instructions in the language corresponding to a language identifier held in the profile data in the MH. User A can retrieve his messages directly from the MH, which is currently resident in Tokyo. If the MH had remained resident in London, then the retrieval of his messages might well be affected by, e.g. transmission congestion.

If a user B, currently registered with New York, now makes a call to user A, New York refers to its PLR 148, ascertains that user A's MH is currently in Tokyo, and attempts to set up a connection with user A. If user A is available, the call is connected to user A over a single transmission link from New York to Tokyo. If user A is not available, user B can effectively leave a Voicemail message in user A's MH, for local retrieval by user A when he next accesses his Voicemail messages. Thus, any user currently registered with any of user A's update networks will be able to connect to user A over a minimum length transmission link, e.g. for a calling user C in Tokyo, the call will be a local call staying within Tokyo.

A further advantage is that if a user D in Tokyo makes a call to user A, Tokyo will access its PLR 148 to see whether there is an entry for user A, and find that user A is currently in Tokyo, so a connection can be made by means of a local call.

Suppose now a first variation where user A's PLR update information is "London" and "New York", i.e. Tokyo's PLR has not been kept up to date, so that when user A requests that his MH be moved to Tokyo, his current MH location (London) cannot be found in Tokyo's PLR 148. The same condition results for a variant Tokyo network which is not equipped with a PLR.

There are a number of options. In a first option, Tokyo ascertains by analysis of user A's telephone number the identity of his home network, and sends a query message to that home network to check that the MH is in that network. If the home network replies that it does not store that MH, then Tokyo broadcasts such a query message to call GEM networks other that the home network. Any network storing an MH for which it receives a query message will respond by sending a reply message indicating that the MH is in that network. In a second option, for finding the location of the MH in as short a time as possible, these query function are combined and Tokyo sends a single broadcast query message to all GMS networks.

In this variation, when Tokyo receives user A's MH from London, only New York and London will update their PLRs 148. Now, when user D makes a call to user A, Tokyo's PLR has no current location information for user A, and a standard call set up procedure is initiated in which Tokyo makes a call to user A's home network and that call is "tromboned" back to Tokyo. Not only is such a call expensive because it involves two long international routes, but also the set up time is noticeably long because of the call processing that the home network has to do. Thus, the advantage of avoiding tromboned calls is obtained when the remote network has its PLR 148 updated.

The MH can include part of the user-associated profile relating to call handling, e.g. Do Not Disturb data for blocking onward connection according to time of day, using either the time zone in which the PLR is resident or time zone in which the MH is resident, or data for blocking onward connection on the basis of a distance threshold, using either geographic or hopcount metric. And in this case, this call handling data can be sent to each of the specified networks of a user's PLR update information and stored in the respective PLRs 148. thus, in the above example, when user B in New York makes a call to user A in Tokyo, the New York PLR is accessed to find the current location of user A, and user A's call handling data is retrieved and analysed to see whether New York can proceed to handle the call. If the result of the analysis is that the call is not to be connected through to Tokyo, the call handling data may provide that the call be connected to New York's Voicemail system. The presence of user A's call handling data in the New York PLR is referred to as remote presence.

User A can select different call handling data for different ones of the specified networks of his PLR update information. Such differentiated remote presence may be based on network location or some other strategic factor.

Whereas the above description is based on the concept of users of GEM networks moving from one network to another, the present invention is also applicable to software agents which travel between interconnected data networks on a global scale, and such software agents constitute mobile objects of the present invention. A travelling software agent might want other software agents to be able to communicate with it, so the software agent has an associated MH, the data networks have PLRs, and when such a software agent travels to a remote network it sends for its MH to be forwarded from its previous hosting network and updates the PLRs of all or a selected set of data networks. Thus, the term "user" as used herein includes such software agents.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to",

What is claimed is:

1. A method of operating a communications network interconnected with a plurality of other communications networks, the method comprising the steps of:

establishing data storage and a location register having entries comprising a user identifier and an associated location identifier; and responding to an originating call to a called user by accessing the location register in accordance with a user identifier for that called user to ascertain the corresponding associated location identifier, and if there is a corresponding entry, and performing connection set up on the basis that the destination network for the called user is that communications network which corresponds to that ascertained location identifier;

the method being characterised in that:

a user-associated relocatable data packages currently located at said communications network are stored in said data storage, and each said location identifier represents the most recent location known to said communications network of the corresponding user-associated relocatable data package;

and the method being characterised by the steps of:

receiving from a said other communications network a move request in respect of a specified user, and in response, removing that specified user's associated relocatable data package from the data storage, and relocating that data package to said other communications network.

2. A method as claimed in claim 1, including the step of responding to receipt from said other communications network of a location register update message in respect of that specified user by changing the location identifier of that specified user's entry to that for said other communications network.

3. A method as claimed in claim 1, including the steps of:

receiving a request from a user, currently registered with said communications network as a visitor, for that visiting user's associated relocatable data package to be relocated to said communications network;

in response to that receipt, accessing the location register in accordance with an identifier for that visiting user; and, if there is a corresponding entry, ascertaining the location identifier of that corresponding entry, and sending a move request in respect of that visiting user to the other communications network corresponding to the ascertained location identifier, else, requesting of at least one of the other communications networks a location identifier for the other communications network currently storing that visiting user's associated relocatable data package.

upon receipt of the requested location identifier, sending a move request in respect of that visiting user to the other communications network corresponding to the received location identifier; and upon receipt of that user's associated relocatable data package, storing it in the data storage.

4. A method as claimed in claim 3, including the steps of retrieving instructions from a received user-associated relocatable data package. arid in accordance with those instructions, effecting modification of each of a predetermined set of the communications networks.

5. A method as claimed in claim 4, wherein the step of effecting modification comprises generating a message and sending that message to each of said predetermined set of the communications networks other than that communications network which performs the step of retrieving instructions.

6. A method as claimed in claim 4, wherein those instructions comprise instructions for modifying the respective location registers by changing the respective stored location identifier to that of the network which performs the step of retrieving instructions.

7. A method as claimed in claim 4, wherein those instructions comprise instructions for storing call handling information and modifying the respective location registers to associate that stored call handling information with the entry corresponding to the received user-associated relocatable data package.

8. A method as claimed in claim 3, wherein the requesting step comprises sending a query message in respect of that visiting user to that one of said other communications networks which corresponds to the global address of that visiting user.

9. A method as claimed in claim 3, wherein the requesting step comprises sending a query message in respect of that visiting user to each of said other communications networks.

10. A method of operating a communications network interconnected with a plurality of other communications networks, at least one of said other communications networks operating in accordance with claim 1, the method comprising the steps of:

receiving a request from a user, currently registered with said communications network as a visitor, for that visiting user's associated relocatable data package to be relocated to said communications network;

in response to that receipt, requesting of at least one of the other communications networks a location identifier for the other communications network currently storing that visiting user's associated relocatable data package;

upon receipt of the requested location identifier, sending to the other communications network corresponding to the received location identifier a move request for that user's associated relocatable data package to be relocated to said communications network, and upon receipt of that user's associated relocatable data package, storing it in association with a user identifier for that user.

11. A method as claimed in claim 1, including the steps of connecting calls for a particular user, whose user-associated relocatable data package is currently located at said communications network, to a message recording service and recording messages, and incorporating those recorded messages within that particular user's relocatable data package.

12. A communications network arranged for interworking with a plurality of other communications networks and employing a global addressing scheme, the network comprising:

a location register arranged to store entries each comprising a user identifier and an associated location identifier; and means arranged to respond to an originating call to a called user by accessing the location register in accordance with an identifier for that called user and ascertaining the associated location identifier, and performing connection set up on the basis that the destination network for the called user is that communications network which corresponds to that ascertained location identifier;

wherein the network is characterised by:

data storing means arranged to store user-associated relocatable data packages;

means arranged to respond to receipt from a said other communications network of a move request in respect of a specified user's associated relocatable data package stored in the data storing means by removing that specified user's associated relocatable data package from the data storing means, and relocating that data package to said other communications network.

13. A network as claimed in claim 12, including means arranged to respond to receipt from said other communications network of a message in respect of that specified user and containing location register update information by changing the location identifier of that specified user's entry to that for said other communications network.

14. A network as claimed in claim 12, including means arranged to respond to a request from a visiting user for that visiting user's associated relocatable data package to be moved to said communications network, by accessing the location register in accordance with an identifier for that visiting user, and, if there is a corresponding entry, ascertaining the associated location identifier, and sending a move request in respect of that visiting user to a said other communications network corresponding to the ascertained location identifier, else requesting of at least one of the other communications networks a location identifier for the other communications network currently storing that visiting users associated relocatable data package, and, upon receipt of the requested location identifier, sending a move request in respect of that visiting user to that other communications network corresponding to that received location identifier.

15. A network as claimed claim 14, including means arranged to retrieve instructions from a received user's relocatable data package, and in accordance with those instructions, to effect modification of each of a predetermined set of the communications networks.

16. A network as claimed in claim 15, wherein the retrieving and modifying means is arranged to effect said modification by generating a message and sending that message to each of said predetermined set of the communications networks other than itself.

17. A network as claimed in claim 15, wherein the retrieving and modifying means is arranged, in accordance with those instructions, to modify the respective location register by changing the respective stored location identifier to its own location identifier.

18. A network as claimed in claim 15, for use when those instructions comprise instructions for storing call handling information, and wherein the retrieving and modifying means is arranged to modify the respective location register to associate such stored call handling information with the entry corresponding to the received user-associated relocatable data package.

19. A network as claimed in claim 14, and arranged to make said request of at least one of the other communications networks for said network identifier by sending a query message in respect of that visiting user to that one of said other communications networks which corresponds to the global address of that visiting user.

20. A network as claimed in claim 14, and arranged to make said request of at least one of the other communications networks for said network identifier by sending a query message in respect of that visiting user to each of said other communications networks.

21. A communications network arranged for interworking with a plurality of other communications networks, at least one of said other communications networks being in accordance with claim 12, said communications network comprising:
  a location register arranged to store entries each comprising a user identifier and an associated location identifier; and
  means arranged to respond to an originating call to a called user by
    accessing the location register in accordance with an identifier for that called user and ascertaining the associated location identifier, and
    performing connection set up on the basis that the destination network for the called user is that communications network which corresponds to that ascertained location identifier;
  wherein the network is characterised by:
    data storing means; and
    means arranged to respond to a request from a user, currently registered with said communications network as a visitor, for that user's associated relocatable data package to be moved to said communications network by
      requesting of at least one of the other communications networks a location identifier for the other communications network currently storing that visiting user's associated data package,
      upon receipt of the requested network identifier, sending to the other communications network corresponding to the received location identifier a move request for that user's associated data package to be relocated to said communications network, and
      upon receipt of that user's associated relocatable data package, storing it in said data storing means in association with a user identifier for that user.

22. A network as claimed in claim 12, having a message recording system, and including means arranged to respond to messages recorded by the message recording system in respect of a particular user whose relocatable data package is currently stored in said data storing means by incorporating those recorded messages within that particular user's relocatable data package.

* * * * *